(12) United States Patent
Wang et al.

(10) Patent No.: US 12,466,433 B2
(45) Date of Patent: Nov. 11, 2025

(54) AUTONOMOUS DRIVING LIDAR TECHNOLOGY

(71) Applicant: TuSimple, Inc., San Diego, CA (US)

(72) Inventors: Panqu Wang, San Diego, CA (US); Yu Wang, San Diego, CA (US); Xiangchen Zhao, San Diego, CA (US); Dongqiangzi Ye, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 232 days.

(21) Appl. No.: 18/070,102

(22) Filed: Nov. 28, 2022

(65) Prior Publication Data

US 2023/0182774 A1 Jun. 15, 2023

Related U.S. Application Data

(60) Provisional application No. 63/290,002, filed on Dec. 15, 2021.

(51) Int. Cl.
*B60W 60/00* (2020.01)
*B60W 40/04* (2006.01)
*G01S 17/89* (2020.01)
*G01S 17/931* (2020.01)
*G06V 20/58* (2022.01)
*G06V 20/70* (2022.01)

(52) U.S. Cl.
CPC ........ *B60W 60/0011* (2020.02); *B60W 40/04* (2013.01); *G01S 17/89* (2013.01); *G01S 17/931* (2020.01); *G06V 20/58* (2022.01); *G06V 20/70* (2022.01); *B60W 2300/145* (2013.01); *B60W 2420/403* (2013.01); *B60W 2420/408* (2024.01); *B60W 2556/20* (2020.02)

(58) Field of Classification Search
CPC ............ B60W 60/0011; B60W 40/04; B60W 2300/145; B60W 2420/403; B60W 2420/408; B60W 2556/20; G01S 17/87; G01S 17/89; G01S 17/931; G01S 7/4802; G01S 7/4808; G06V 20/58; G06V 20/70; G06V 10/82
See application file for complete search history.

(56) References Cited

U.S. PATENT DOCUMENTS 11,055,566 B1 * 7/2021 Pham ..................... G06V 10/82
11,062,454 B1 * 7/2021 Cohen .................... G01S 7/417
(Continued)

*Primary Examiner* — Aaron L Troost
(74) *Attorney, Agent, or Firm* — Perkins Coie LLP

(57) ABSTRACT

Autonomous vehicles can include systems and apparatus for performing signal processing on point cloud data from Light Detection and Ranging (LiDAR) devices located on the autonomous vehicles. A method includes obtaining, by a computer located in an autonomous vehicle, a combined point cloud data that describes a plurality of areas of an environment in which the autonomous vehicle is operating; determining that a first set of points from the combined point cloud data are located within fields of view of cameras located on the autonomous vehicle; assigning one or more labels to a second set of points from the first set of points in response to determining that the second set of points are located within bounding box(es) around object(s) in images obtained from the cameras; and causing the autonomous vehicle to operate based on characteristic(s) of the object(s) determined from the second set of points.

18 Claims, 7 Drawing Sheets

(56) References Cited

U.S. PATENT DOCUMENTS

| | | |
|---|---|---|
| 2019/0178974 A1 | 6/2019 | Droz |
| 2020/0005485 A1* | 1/2020 | Xu .................. G01S 13/931 |
| 2020/0064483 A1* | 2/2020 | Li .................... G01S 13/867 |
| 2020/0249353 A1* | 8/2020 | Di Cicco ........... G01S 7/4808 |
| 2021/0084235 A1 | 3/2021 | Nie |
| 2021/0256718 A1* | 8/2021 | Gangundi ............ G06V 10/82 |
| 2023/0177818 A1* | 6/2023 | Kaithakauzha ....... G01S 7/4802 |
| | | 382/106 |

* cited by examiner

AUTONOMOUS DRIVING LIDAR TECHNOLOGY

CROSS-REFERENCE TO RELATED APPLICATIONS

This document claims priority to and benefits of U.S. Patent Application No. 63/290,002, filed on Dec. 15, 2021. The aforementioned application is incorporated by reference in its entirety.

TECHNICAL FIELD

This document describes techniques to perform signal processing on point cloud data provided by multiple Light Detection and Ranging (LiDAR) devices located on or in a vehicle for autonomous driving operations.

BACKGROUND

A vehicle may include sensors such as cameras attached to the vehicle for several purposes. For example, cameras may be attached to a roof of the vehicle for security purposes, for driving aid, or for facilitating autonomous driving. The sensors mounted on a vehicle can obtain sensor data (e.g., images) of one or more areas surrounding the vehicle. The sensor data can be processed to obtain information about the road or about the objects surrounding the vehicle. For example, images obtained by a camera can be analyzed to determine distances of objects surrounding the autonomous vehicle so that the autonomous vehicle can be safely maneuvered around the objects.

SUMMARY

Autonomous driving technology can enable a vehicle to perform autonomous driving operations by determining characteristics of a road (e.g., stop sign, curvature or location of a lane) and/or characteristics of objects (e.g., pedestrians, vehicles) located on the road. One or more computers located in the vehicle can determine the characteristics of the road and/or objects on the road by performing signal processing on sensor data provided by sensors located on or in the vehicle, where the sensors may include cameras, Light Detection and Ranging (LiDAR), and/or radar. This patent document describes techniques for performing signal processing on sensor data (e.g., point cloud data (PCD)) obtained from at least two LiDARs on the vehicle to combine the PCD and/or to determine information about one or more objects on the road so that the vehicle can perform autonomous driving operations.

An example method of autonomous vehicle operation, comprises obtaining, by a computer located in an autonomous vehicle, a combined point cloud data that describes a plurality of areas of an environment in which the autonomous vehicle is operating (e.g., on a road), where the combined point cloud data is obtained by performing a signal processing technique on multiple sets of point cloud data obtained from a plurality of light detection and ranging sensors located on the autonomous vehicle; determining that a first set of points from the combined point cloud data are located within a plurality of fields of view of a plurality of cameras located on the autonomous vehicle; assigning one or more labels to a second set of points from the first set of points in response to determining that the second set of points are located within one or more bounding boxes around one or more objects in images obtained from the plurality of cameras, where the one or more labels include information that identifies the one or more objects; and causing the autonomous vehicle to operate based on one or more characteristics of the one or more objects determined from the second set of points.

In some embodiments, the signal processing technique to obtain the combined point cloud data comprises: receiving, from each of at least two light detection and ranging sensors of the plurality of light detection and ranging sensors, a first set of point cloud data of at least two areas of the plurality of areas of the environment, wherein the multiple sets of point cloud data include the first set of point cloud data that is scanned or obtained at a first time; and obtaining a first set of combined point cloud data by combining the first set of point cloud data of each of the least two light detection and ranging sensors, where the combined point cloud data includes the first set of combined point cloud data.

In some embodiments, the method further comprises receiving, from each of the at least two light detection and ranging sensors, a second set of point cloud data of at least some of the at least two areas, wherein the multiple sets of point cloud data include the second set of point cloud data that is scanned or obtained at a second time later than the first time; obtaining a second set of combined point cloud data by combining the second set of point cloud data of each of the least two light detection and ranging sensors, where the combined point cloud data includes the first set of combined point cloud data combined with the second set of combined point cloud data.

In some embodiments, the first set of combined point cloud data and the second set of combined point cloud data are obtained by: projecting the first set of point cloud data of each of the at least two light detection and ranging sensors onto a three dimensional inertial measurement unit coordinate system using first extrinsic parameters, where the first extrinsic parameters describe a spatial relationship between each of the at least two light detection and ranging sensors and an inertial measurement unit located on or in the autonomous vehicle; and projecting the second set of point cloud data of each of the at least two light detection and ranging sensors onto the three dimensional inertial measurement unit coordinate system using the first extrinsic parameters. In some embodiments, the first extrinsic parameters include IMU-to-LiDAR extrinsic parameters. In some embodiments, the first extrinsic parameters include sets of parameters that are unique to each of the at least two light detection and ranging sensors. In some embodiments, a plurality of sets of combined point cloud data include the first set of combined point cloud data and the second set of combined point cloud data, and wherein a number (or count or total number) of the plurality of sets of combined point cloud data is predetermined.

In some embodiments, each set of point cloud data from the multiple sets of point cloud data is scanned or obtained by a light detection and ranging sensor within a time window, and wherein the first time and the second time are within the time window. In some embodiments, the time window is predetermined. In some embodiments, the first set of combined point cloud data is combined with the second set of combined point cloud data by: obtaining a transformed set of point cloud data by transforming the first set of combined point cloud data and the second set of combined point cloud data to a global coordinate system; and obtaining the combined point cloud data by transforming the transformed set of point cloud data to three dimensional inertial measurement unit coordinates associated with the second time when the second set of point cloud data was obtained or scanned by the least two light detection and ranging sensors.

In some embodiments, each point in the combined point cloud data is associated with a timestamp when a point was scanned or obtained by a light detection and ranging sensor. In some embodiments, the method further comprises: assigning a background label to a third set of points from the first set of points, wherein the third set of points are located outside the one or more bounding boxes around the one or more objects in the images obtained from the plurality of cameras, where the background label indicates that the third set of points are associated with a background in the images. In some embodiments, the method further comprises assigning an unknown label to a fourth set of points from the combined point cloud data in response to determining that the fourth set of points are located outside of the plurality of fields of view of the plurality of cameras.

In some embodiments, the first set of points and the fourth set of points are determined from the combined point cloud data that is projected to the images of the plurality of cameras using second extrinsic parameters, wherein the second extrinsic parameters describe a spatial relationship between each of the plurality of cameras and an inertial measurement unit located on or in the autonomous vehicle. In some embodiments, the second extrinsic parameters include IMU-to-camera extrinsic parameters. In some embodiments, each of the one or more labels includes an object identifier that identifies an object, an object classification that classifies the object, and a confidence value that indicates a confidence level that a label accurately describes the object. In some embodiments, the one or more labels include one or more object identifiers that include unknown, car, truck, bus, pedestrian, motorcycle, cycle, traffic cone, truck head, head, or tail. In some embodiments, the plurality of light detection and ranging sensors are located on a roof of the autonomous vehicle and around an outer region of the autonomous vehicle.

In some embodiments, the plurality of light detection and ranging sensors include at least five light detection and ranging sensors, a first light detection and ranging sensor is located on a first side of a hood, a second light detection and ranging sensor is located on the hood on a second side opposite to the first side, a third light detection and ranging sensor is located on a roof of the autonomous vehicle, a fourth light detection and ranging sensor is located on one side of the autonomous vehicle, and a fifth light detection and ranging sensor is located on another side opposite to the one side of the autonomous vehicle. In some embodiments, the third light detection and ranging sensor has a scanning range that is longer than that of the first light detection and ranging sensor, the second light detection and ranging sensor, the fourth light detection and ranging sensor, and the fifth light detection and ranging sensor.

In another exemplary aspect, the above-described methods are embodied in the form of processor-executable code and stored in a non-transitory computer-readable storage medium. The non-transitory computer readable storage includes code that when executed by a processor, causes the processor to implement the above-described methods as described in the embodiments.

In yet another exemplary embodiment, a device that is configured or operable to perform the above-described methods is disclosed.

In yet another exemplary embodiment, a system for autonomous vehicle operation comprises a computer that comprises at least one processor and at least one memory including computer program code which, when executed by the at least one processor, cause the computer to at least implement the above-described methods as described in the embodiments.

The above and other aspects and their implementations are described in greater detail in the drawings, the descriptions, and the claims.

DETAILED DESCRIPTION

An autonomous vehicle may include sensors such as cameras and a plurality of Light Detection and Ranging (LiDARs) mounted on the autonomous vehicle to obtain sensor data (e.g., point cloud data (PCD) from the LiDARs and/or images from the camera) of one or more areas surrounding the autonomous vehicle. The sensor data can be obtained and analyzed by one or more computers on-board the autonomous vehicle to determine characteristics of objects (e.g., vehicles or pedestrians) surrounding the autonomous vehicle on the road. The characteristics of the object may include a distance of the object from the autonomous vehicle and/or speed of the object. The computer(s) located in the autonomous vehicle can perform signal processing techniques on sensor data obtained from LiDARs so that the computer(s) can precisely or accurately detect an object and determine its characteristics. Section I of this patent document describes an example vehicle ecosystem in which the example signal processing techniques described in Section II of this patent document can be performed. In Section II, this patent document describes example signal processing techniques for effectively combining and analyzing PCD received from at least two LiDARs so that the signal processing techniques can provide characteristics of objects on the road in some embodiments. In Section III, this patent document describes example offline signal processing techniques that can be used to accurately generate a 3D bounding box over an object.

I. Example Vehicle Ecosystem for Autonomous Driving Radar Technology

Figure 1:
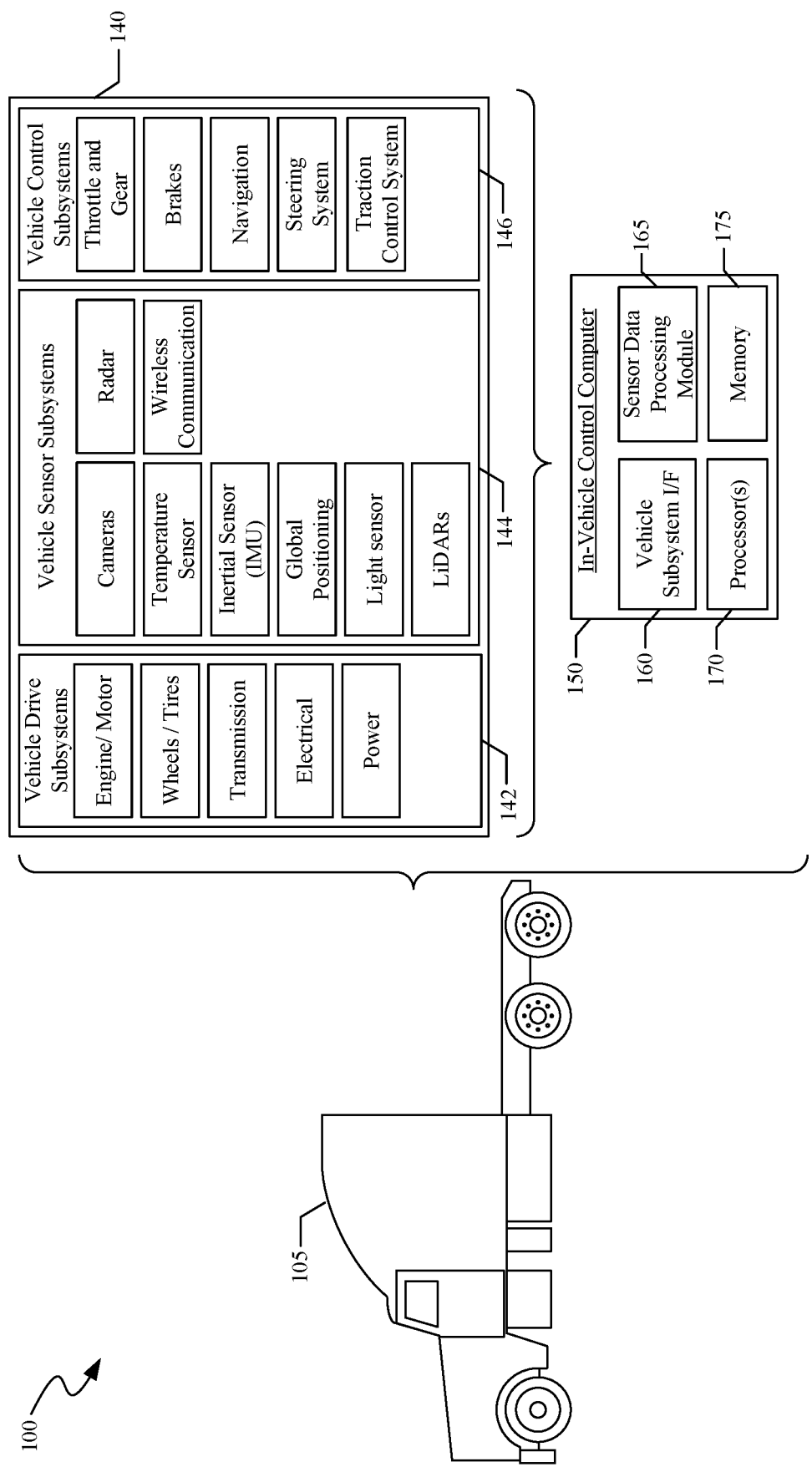
FIG. 1 shows a block diagram of an example vehicle ecosystem for autonomous driving LiDAR technology.

FIG. 1 shows a block diagram of an example vehicle ecosystem 100 for autonomous driving LiDAR technology.

The vehicle ecosystem 100 may include an in-vehicle control computer 150 is located in the autonomous vehicle 105. The sensor data processing module 165 of the in-vehicle control computer 150 can perform signal processing techniques on sensor data received from multiple LiDARs on the autonomous vehicle 105 so that the signal processing techniques can provide characteristics of objects located on the road where the autonomous vehicle 105 is operated in some embodiments. The sensor data processing module 165 can use at least the information about the characteristics of the one or more objects to send instructions to one or more devices (e.g., motor in the steering system or brakes) in the autonomous vehicle 105 to steer and/or apply brakes.

As shown in FIG. 1, the autonomous vehicle 105 may be a semi-trailer truck. The vehicle ecosystem 100 may include several systems and components that can generate and/or deliver one or more sources of information/data and related services to the in-vehicle control computer 150 that may be located in an autonomous vehicle 105. The in-vehicle control computer 150 can be in data communication with a plurality of vehicle subsystems 140, all of which can be resident in the autonomous vehicle 105. The in-vehicle computer 150 and the plurality of vehicle subsystems 140 can be referred to as autonomous driving system (ADS). A vehicle subsystem interface 160 is provided to facilitate data communication between the in-vehicle control computer 150 and the plurality of vehicle subsystems 140. In some embodiments, the vehicle subsystem interface 160 can include a controller area network (CAN) controller to communicate with devices in the vehicle subsystems 140.

The autonomous vehicle 105 may include various vehicle subsystems that support the operation of autonomous vehicle 105. The vehicle subsystems may include a vehicle drive subsystem 142, a vehicle sensor subsystem 144, and/or a vehicle control subsystem 146. The components or devices of the vehicle drive subsystem 142, the vehicle sensor subsystem 144, and the vehicle control subsystem 146 as shown as examples. In some embodiment, additional components or devices can be added to the various subsystems. Alternatively, in some embodiments, one or more components or devices can be removed from the various subsystems. The vehicle drive subsystem 142 may include components operable to provide powered motion for the autonomous vehicle 105. In an example embodiment, the vehicle drive subsystem 142 may include an engine or motor, wheels/tires, a transmission, an electrical subsystem, and a power source.

The vehicle sensor subsystem 144 may include a number of sensors configured to sense information about an environment in which the autonomous vehicle 105 is operating or a condition of the autonomous vehicle 105. The vehicle sensor subsystem 144 may include one or more cameras or image capture devices, one or more temperature sensors, an inertial measurement unit (IMU), a Global Positioning System (GPS) device, a plurality of LiDARs, one or more radars, and/or a wireless communication unit (e.g., a cellular communication transceiver). The vehicle sensor subsystem 144 may also include sensors configured to monitor internal systems of the autonomous vehicle 105 (e.g., an $O_2$ monitor, a fuel gauge, an engine oil temperature, etc.,). In some embodiments, the vehicle sensor subsystem 144 may include sensors in addition to the sensors shown in FIG. 1.

The IMU may include any combination of sensors (e.g., accelerometers and gyroscopes) configured to sense position and orientation changes of the autonomous vehicle 105 based on inertial acceleration. The GPS device may be any sensor configured to estimate a geographic location of the autonomous vehicle 105. For this purpose, the GPS device may include a receiver/transmitter operable to provide information regarding the position of the autonomous vehicle 105 with respect to the Earth. Each of the one or more radars may represent a system that utilizes radio signals to sense objects within the environment in which the autonomous vehicle 105 is operating. In some embodiments, in addition to sensing the objects, the one or more radars may additionally be configured to sense the speed and the heading of the objects proximate to the autonomous vehicle 105. The laser range finders or LiDARs may be any sensor configured to sense objects in the environment in which the autonomous vehicle 105 is located using lasers or a light source. The cameras may include one or more cameras configured to capture a plurality of images of the environment of the autonomous vehicle 105. The cameras may be still image cameras or motion video cameras.

The vehicle control subsystem 146 may be configured to control operation of the autonomous vehicle 105 and its components. Accordingly, the vehicle control subsystem 146 may include various elements such as a throttle and gear, a brake unit, a navigation unit, a steering system and/or a traction control system. The throttle may be configured to control, for instance, the operating speed of the engine and, in turn, control the speed of the autonomous vehicle 105. The gear may be configured to control the gear selection of the transmission. The brake unit can include any combination of mechanisms configured to decelerate the autonomous vehicle 105. The brake unit can use friction to slow the wheels in a standard manner. The brake unit may include an Anti-lock brake system (ABS) that can prevent the brakes from locking up when the brakes are applied. The navigation unit may be any system configured to determine a driving path or route for the autonomous vehicle 105. The navigation unit may additionally be configured to update the driving path dynamically while the autonomous vehicle 105 is in operation. In some embodiments, the navigation unit may be configured to incorporate data from the GPS device and one or more predetermined maps so as to determine the driving path for the autonomous vehicle 105. The steering system may represent any combination of mechanisms that may be operable to adjust the heading of autonomous vehicle 105 in an autonomous mode or in a driver-controlled mode.

In FIG. 1, the vehicle control subsystem 146 may also include a traction control system (TCS). The TCS may represent a control system configured to prevent the autonomous vehicle 105 from swerving or losing control while on the road. For example, TCS may obtain signals from the IMU and the engine torque value to determine whether it should intervene and send instruction to one or more brakes on the autonomous vehicle 105 to mitigate the autonomous vehicle 105 swerving. TCS is an active vehicle safety feature designed to help vehicles make effective use of traction available on the road, for example, when accelerating on low-friction road surfaces. When a vehicle without TCS attempts to accelerate on a slippery surface like ice, snow, or loose gravel, the wheels can slip and can cause a dangerous driving situation. TCS may also be referred to as electronic stability control (ESC) system.

Many or all of the functions of the autonomous vehicle 105 can be controlled by the in-vehicle control computer 150. The in-vehicle control computer 150 may include at least one processor 170 (which can include at least one microprocessor) that executes processing instructions stored in a non-transitory computer readable medium, such as the memory 175. The in-vehicle control computer 150 may also represent a plurality of computing devices that may serve to control individual components or subsystems of the autonomous vehicle 105 in a distributed fashion. In some embodiments, the memory 175 may contain processing instructions (e.g., program logic) executable by the processor 170 to perform various methods and/or functions of the autonomous vehicle 105, including those described for the sensor data processing module 165 as explained in this patent document. For example, the processor 170 of the in-vehicle control computer 150 and may perform operations described in this patent document in, for example, FIGS. 3 and 4.

The memory 175 may contain additional instructions as well, including instructions to transmit data to, receive data from, interact with, or control one or more of the vehicle drive subsystem 142, the vehicle sensor subsystem 144, and the vehicle control subsystem 146. The in-vehicle control computer 150 may control the function of the autonomous vehicle 105 based on inputs received from various vehicle subsystems (e.g., the vehicle drive subsystem 142, the vehicle sensor subsystem 144, and the vehicle control subsystem 146).

Figure 2:
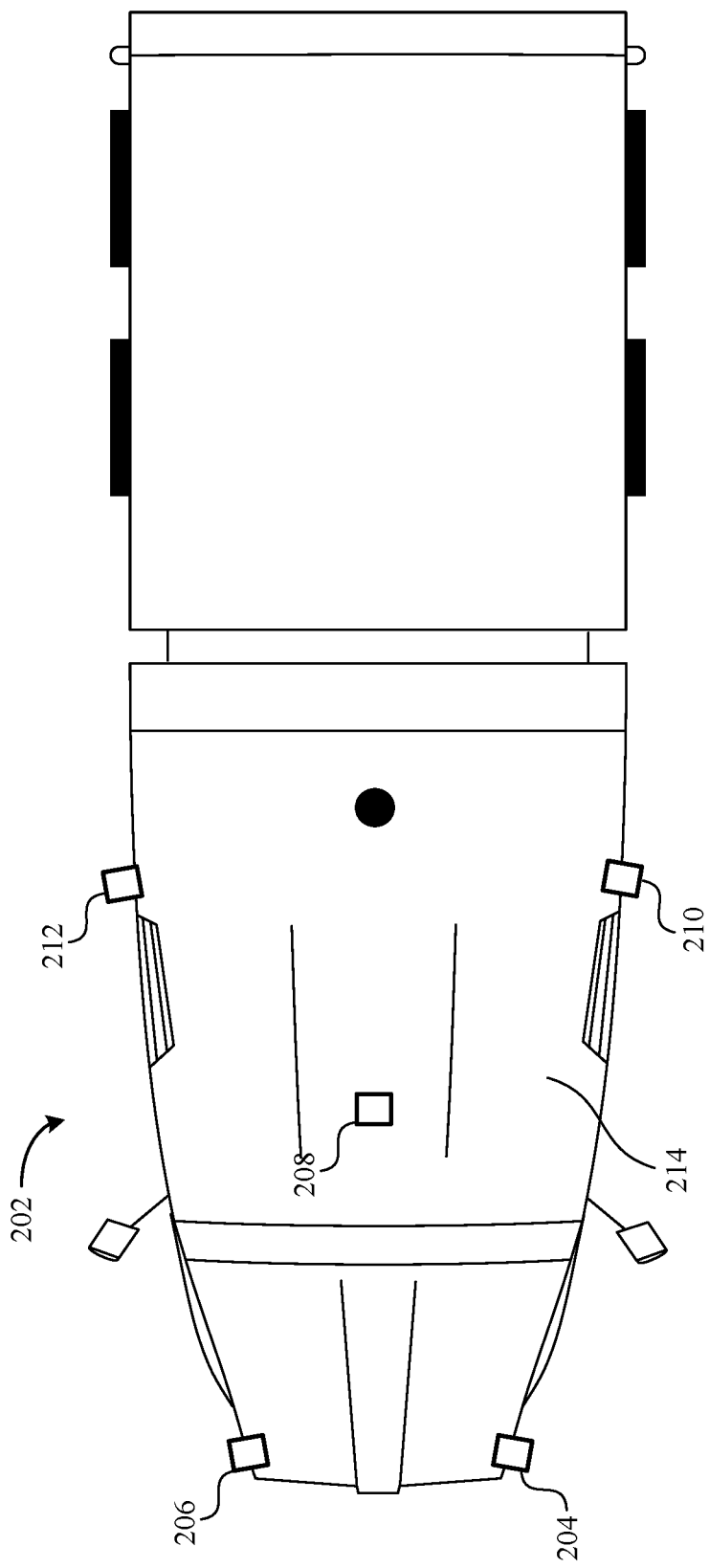
FIG. 2 shows a top view of an autonomous vehicle that includes a plurality of LiDARs.

FIG. 2 shows a top view of an autonomous vehicle 202 that may include a plurality of LiDARs 204 to 212. The locations of the plurality of LiDARs 204 to 212 are exemplary. As shown in FIG. 2, the autonomous vehicle 202 may include a tractor portion of a semi-trailer truck. LiDARs 204 to 206 may be respectively coupled to a front left corner of the hood (or on a first side of the hood) and front right corner of a hood (or on a second side of the hood opposite to the first side) of the autonomous vehicle 202. LiDAR 208 may be coupled to a roof (or top) of a cab 214 of the autonomous vehicle 202. And LiDARs 210 and 212 may be respectively coupled to a left side and right side of the cab 214 of the autonomous vehicle 202. Thus, LiDARs 204, 206, 210, and 212 may be located around an outer region of a cab 214 of the autonomous vehicle 202.

The plurality of LiDARs 204 to 212 may be located around most or all of the autonomous vehicle 202 so that the LiDARs can obtain sensor data from several areas in front of, next to, and/or behind the autonomous vehicle 202. For example, LiDARs 204 to 208 can scan and obtain sensor data of an area that is in front and sides of the autonomous vehicle 202, radars 210 and 212 can respectively scan and obtain sensor data of areas to the side left and side right of the autonomous vehicle 202. The plurality of LiDARs 204 to 212 is communicably coupled to the in-vehicle control computer (shown as 150 in FIG. 1). The sensor data obtained by the plurality of LiDARs 204 to 212 are sent to the sensor data processing module 165 for signal processing as further described in Section II of this patent document.

In some embodiments, the LiDARs (e.g., 204, 206, 210, 212) located on an outer region of the autonomous vehicle 202 may be near range LiDARs. For example, LiDARs 204 and 206 located towards the front of the autonomous vehicle 202 may have a scanning range of up to 100 meters, and LiDARs 210 and 212 located towards the middle or rear of the autonomous vehicle 202 may have a scanning range of up to 60 meters. In some embodiments, the LiDAR 208 located on the roof can have a longer scanning range of up to 200 meters.

Figure 3:
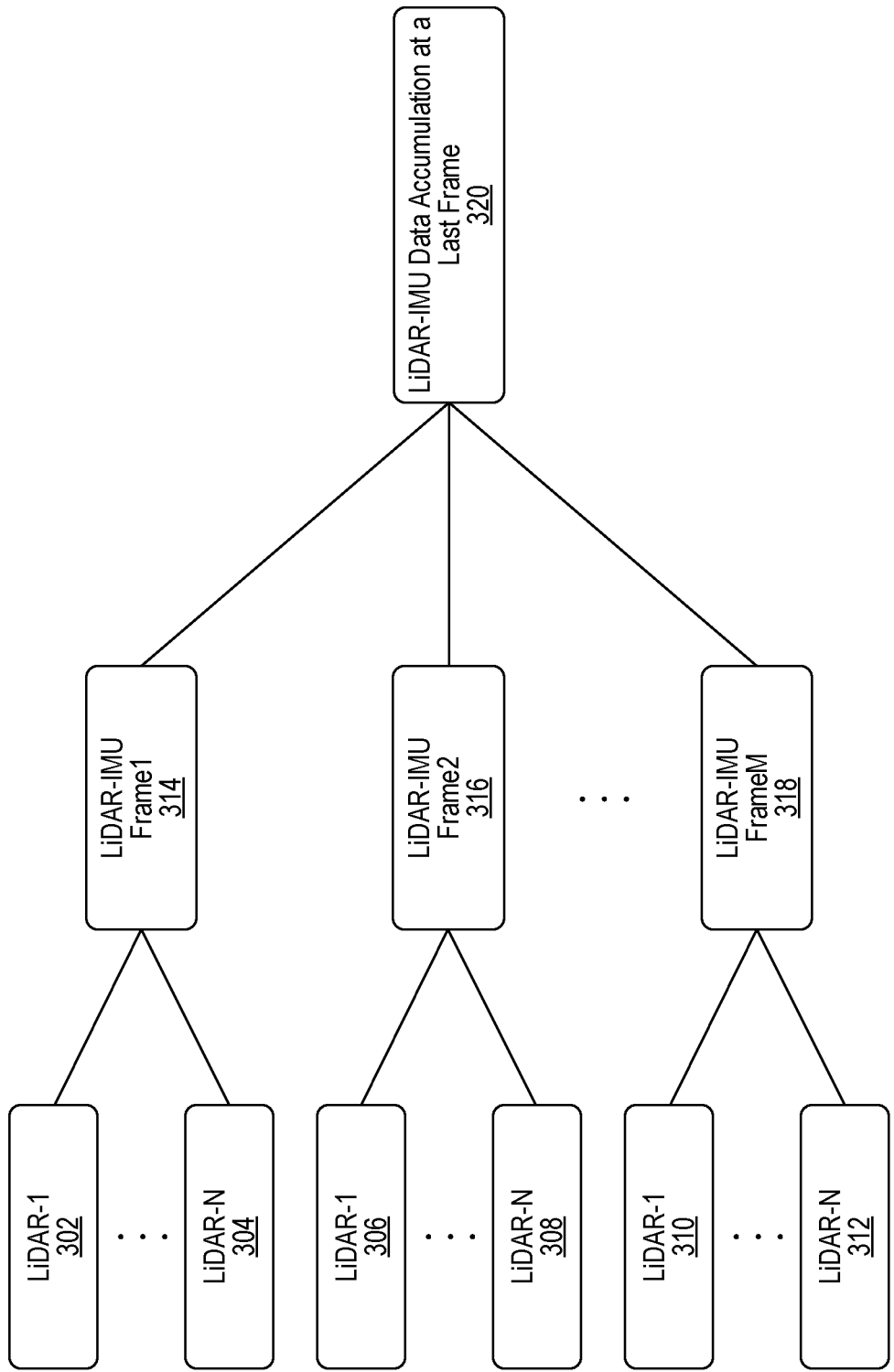
FIG. 3 shows a block diagram to perform an example signal processing technique to process point cloud data (PCD) obtained by at least two LiDARs over time.

II. Example Signal Processing Techniques for Autonomous Driving LiDAR Technology FIG. 3 shows a block diagram to perform an example signal processing technique to process PCD obtained by at least two LiDARs over time. The at least two LiDARs may be located on an autonomous vehicle. The operations associated with blocks 302 to 320 can be performed by the sensor data processing module of the in-vehicle control computer located in a vehicle. As further explained below, FIG. 3 shows signal processing techniques on multiple sets of PCD obtained by a same set of two or more LiDARs over multiple times (e.g., within a time window). Each LiDAR within each set of two or more LiDARs may scan an area at one time and may send a set of PCD to the sensor data processing module for signal processing as further explained in this patent document. Thus, in FIG. 3, the two or more LiDARs shown as 302 and 304 are respectively the same as the two or more LiDARs shown as 306 and 308, and that are respectively the same as the two or more LiDARs 310 and 312. For example, in FIG. 3, LiDAR-1 302 may send one set of PCD scanned at a first time to the sensor data processing module that uses it to obtain the LiDAR-IMU Frame1 314 as explained below; LiDAR-1 306 (which may be the same as LiDAR-1 302) may send another set of PCD scanned at a second time later than the first time to the sensor data processing module that uses it to obtain the LiDAR-IMU Frame2 316 as explained below; and LiDAR-1 310 (which may be the same as LiDAR-1 302 and LiDAR-1 306) may send yet another set of PCD scanned at a third time later than the second time to the sensor data processing module that uses it to obtain the LiDAR-IMU FrameM 318 as explained below. Similarly, each of one or more LiDARs in addition to LiDAR-1 can scan or obtain multiple sets of PCD over time and can send the multiple sets of PCD to the sensor data processing module for signal processing as further described below. In FIG. 3, the value for N in "LiDAR-N" may be an integer greater than or equal to two.

Each of the two or more LiDARs 302, 304 scan and/or obtain a first set of PCD at a first time. The sensor data processing module can receive the first set of PCD from each of the two or more LiDARs 302, 304. The sensor data processing module may obtain or generate a LiDAR-IMU Frame1 314 by combining a first set of PCD received from each of the two or more LiDARs 302, 304. The sensor data processing module can combine the first set of PCD from each of the two or more LiDARs 302, 304 by projecting the first set of PCD from each of the two or more LiDARs 302, 304 onto three-dimensional (3D) IMU coordinate system using IMU-to-LiDAR extrinsic parameters that may be previously determined. The IMU-to-LiDAR extrinsic parameters describe a spatial relationship between each of the two or more LiDARs 302, 304 and an IMU located on or in the autonomous vehicle. Thus, the IMU-to-LiDAR extrinsic parameters may include one set of parameters that are specifically related to the LiDAR 302 and another set of parameters that are specifically related to LiDAR 304. Thus, the IMU-to-LiDAR extrinsic parameters may include parameters unique to each LiDAR. The LiDAR-IMU Frame1 314 may include a first set of combined PCD associated with the IMU coordinates where the first set of combined PCD includes the first set of PCD obtained by each of the two or more LiDARs 302, 304, where the first set of PCD is associated with the first time when the first set of PCD was scanned or obtained. Thus, the sensor data processing module can fuse all of the first sets of PCD from the two or more LiDARs into the IMU coordinate system.

The sensor data processing module receives a second set of PCD from each of two or more LiDARs 306, 308, where the second set of PCD may be obtained or scanned by each of the two or more LiDARs 306, 308 at a second time later than the first time. Each of two or more LiDARs 306, 308 may scan an area that may at least partially overlap with the area that was scanned by the two or more LiDARs 302, 304. The sensor data processing module may obtain or generate a LiDAR-IMU Frame2 316 by combining a second set of PCD received from each of the two or more LiDARs 306, 308. The sensor data processing module can combine the second set of PCD from each of the two or more LiDARs 306, 308 by projecting the second set of PCD from each of the two or more LiDARs 306, 308 onto 3D IMU coordinate system using IMU-to-LiDAR extrinsic parameters as explained above for the first set of PCD. The LiDAR-IMU Frame2 316 may include a second set of combined PCD associated with the IMU coordinates where the second set of combined PCD includes the second set of PCD obtained by each of the two or more LiDARs 306, 308, where the second set of PCD is associated with the second time when the second set of PCD was scanned or obtained.

The sensor data processing module receives a M-th set of PCD from each of two or more LiDARs 310, 312, where the M-th set of PCD may be obtained or scanned by each of the two or more LiDARs 310, 312 at a M-th time later than the first time, where M is an integer greater than two. Each of two or more LiDARs 310, 312 may scan an area that may at least partially overlap with the area that were scanned by the two or more LiDARs that provided data that was combined in a frame immediately prior to FrameM. The sensor data processing module may obtain or generate a LiDAR-IMU FrameM 318 by combining the M-th set of PCD received from each of the two or more LiDARs 310, 312. The sensor data processing module can combine the M-th set of PCD from each of the two or more LiDARs 310, 312 by projecting the M-th set of PCD onto 3D IMU coordinate system using IMU-to-LiDAR extrinsic parameters as explained above for the first and second sets of PCD. The LiDAR-IMU FrameM 318 may include a M-th set of combined PCD associated with the IMU coordinates where the M-th set of combined PCD includes the M-th set of PCD obtained by each of the two or more LiDARs 310, 312, where the M-th set of PCD is associated with the M-th time when the M-th set of PCD was scanned or obtained. In some embodiments, each point in set of combined PCD in Frame1 to FrameM may include an identifier tag that identifies the LiDAR that sent that point in the set of PCD.

In some embodiments, the sensor data processing module can obtain multiple sets of combined PCD over a time window that may be predetermined. In some embodiments, the number of frames (e.g., the value of M) that are combined at block 320 may be predetermined. At or after the M-th time, the sensor data processing module can obtain multiple sets of combined PCD, where the multiple sets of combined PCD can describe the PCD data obtained at the M-th time and one or more times previous to the M-th time. For example, if M=5, then the sensor data processing module can obtain 5 sets of combined PCD, where the first set of combined PCD is associated with the first time, the second set of combined PCD is associated with the second time later than the first time, and so on until the fifth set of combined PCD is associated with the fifth time.

At block 320, the sensor data processing module can combine or fuse the multiple sets of combined PCD scanned or obtained over the time window or over a certain number of frames to obtain a LiDAR-IMU data accumulation at a last frame. Using the example mentioned above, if M=5, then the sensor data processing module can combine all five LiDAR-IMU frames.

The sensor data processing module can combine or fuse the multiple sets of combined PCD by transforming each point in the multiple sets of combined PCD to global coordinate system and then transforming each point from global coordinates back to the IMU coordinates associated with a time with the PCDs that were combined into the last set of combined PCD were obtained or scanned. The sensor data processing module can combine or fuse the multiple sets of combined PCD into the IMU coordinates associated a time when the PCDs used to obtain the last set of combined PCD were obtained or scanned, where the last set of combined PCD (e.g., shown as LiDAR-IMU FrameM 318) is associated with a time later than the other LiDAR-IMU Frames.

In some embodiments, each point in set of combined PCD in Frame1 to FrameM may include a timestamp or time flag that indicates a time when that that point in the set of PCD was scanned or obtained. Thus, the timestamp or the time flag can indicate the frame from which a certain point is associated.

Figure 4:
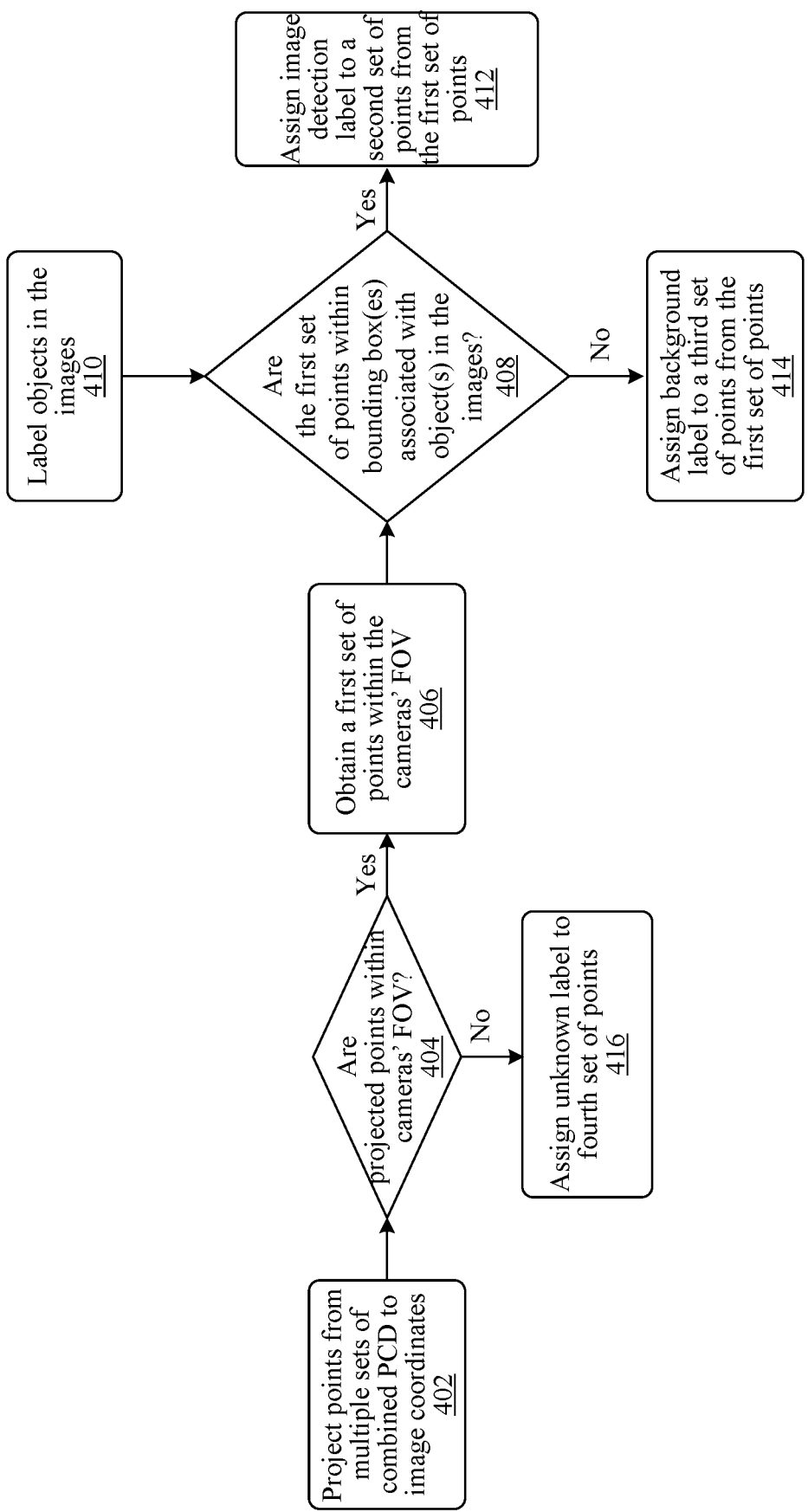
FIG. 4 shows a flowchart of signal processing operations performed to associate points from multiple sets of combined PCD to information associated with images obtained by cameras located on an autonomous vehicle.

FIG. 4 shows a flowchart of signal processing operations performed to associate points from multiple sets of combined PCD to information associated with images obtained by cameras located on an autonomous vehicle. A sensor data processing module can obtain the multiple sets of combined PCD by performing the operations described in FIG. 3 to obtain the LiDAR-IMU data accumulation at a last frame 320. At operation 402, the sensor data processing module can project points from the multiple sets of combined PCD onto two-dimensional (2D) images obtained from a plurality of cameras located on the autonomous vehicle. The sensor data processing module can project points to the 2D images by using IMU-to-camera extrinsic parameters that may be previously determined to project the points to image coordinates. The IMU-to-camera extrinsic parameters describe a spatial relationship between each of the plurality of cameras and an IMU located on or in the autonomous vehicle. Thus, the IMU-to-camera extrinsic parameters may include one set of parameters that are specifically related to one camera and another set of parameters that are specifically related to another camera.

At operation 404, the sensor data processing module can determine whether the points projected to image coordinates are within the fields of view (FOV) of the plurality of cameras. At operation 404, if the sensor data processing module determines that at least a first set of points projected to image coordinates are within the FOV of the plurality of cameras, then the sensor data processing module can obtain or identify the first set of points at operation 406. Signal processing techniques to obtain or identify or determine a second set of points and the third set of points from the first set of points are described below in this patent document.

At operation 404, if the sensor data processing module determines that at least a fourth set of points projected to image coordinates are not within the FOV of the plurality of cameras, then the sensor data processing module can assign an "unknown label" to the fourth set of points at operation 416. For example, in a database stored in the in-vehicle control computer, the sensor data processing module can include an "unknown label" for each of the fourth set of points stored in the database, where the unknown label indicates that the points associated with the unknown label is out of a FOV of the plurality of cameras.

At operation 408, the sensor data processing module can determine whether the first set of points are located within one or more bounding boxes of one or more objects located in the images that are obtained from operation 410. At operation 410, the sensor data processing module can use image processing techniques to identify one or more objects in images obtained from the cameras and to place a bounding box around the one or more objects in the images. At operation 410, the sensor data processing module can also use image processing techniques to identify the one or more objects in the images and associate each of the one or more objects with a corresponding label that includes information that identifies an object (e.g., information associated with one or more labels may include one or more object identifiers such as unknown, car, truck, bus, pedestrian, motorcycle, cycle, traffic-cone, truck-head, head, tail). In some embodiments, the sensor data processing module can include in the label information that includes an object an object identifier (e.g., car), an object classification (e.g., vehicle), a confidence value that indicates a confidence level that a label accurately describes an object, etc.

At operation 408, if the sensor data processing module determines that at least a second set of points from the first set of points are located within one or more bounding boxes of the one or more objects in the images, then the sensor data processing module can assign an image label to the second set of points at operation 412. In some embodiments, the second set of points may be the same as the first set of points in scenarios where the entire image includes one or more objects that are identified with one or more labels. At operation 412, the sensor data processing module can assign a label to each point in the second set of points, where the label is associated with an object where a point is located. For example, in a database stored in the in-vehicle control computer, the sensor data processing module can include a motorcycle label for a first group of points from the second set of points, where the first group of points are located in a bounding box of an object identified and labeled by the sensor data processing module as a motorcycle. In another example, the sensor data processing module can include a traffic-cone label for a second group of points from the second set of points, where the second group of points are located in another bounding box of another object identified and labeled by the sensor data processing module as a traffic-cone.

At operation 408, if the sensor data processing module determines that at least a third set of points from the first set of points are not located within one or more bounding boxes of the one or more objects in the images, then the sensor data processing module assigns a background label to the third set of points at operation 414. The sensor data processing module can assign a background label to those points that are not associated with a labeled object.

The labeled second set of points and the labeled third set of points can provide the sensor data processing module with information about the object(s) in the bounding box (es). For example, the sensor data processing module can obtain velocity and location information of an object located in front of or to the rear of an autonomous vehicle (e.g., 105 in FIG. 1) using the labeled second set of points and/or the labeled third set of points. Based on the labeled second and/or third sets of points, the sensor data processing module can send instructions to the autonomous vehicle to perform certain autonomous driving related operations. For example, if the sensor data processing module determines, using the labeled second set of points, that a position of an object (e.g., truck) is located in front of the autonomous vehicle is within a predetermined distance of the autonomous vehicle, then the sensor data processing module can send instructions to apply brakes and/or to steer the autonomous vehicle to another lane. In another example, if the sensor data processing module determines, using the labeled second set of points, that a velocity of car located to the rear left of the autonomous vehicle is greater than the speed of the autonomous vehicle and that the position of the car is within a certain distance (e.g., predetermined distance) of the location of the autonomous vehicle, then the sensor data processing module can determine not to change lane onto the left lane where the car is being driven.

In some embodiments, the sensor data processing module can ablate or remote unknown objects using the following steps:
Remove PCD associated with the autonomous vehicle
Remove non-map points by, for example, querying lane on which the autonomous vehicle is operating, generating a mask, and labeling point(s) according to the mask)
Remove ground points
Apply a density-based spatial clustering of applications with noise (DBSCAN) technique to generate a cluster identifier for each point
Find a plurality of cluster identifiers inside each bounding box, and remove all points with the same cluster identifier
Generate axis-aligned bounding boxes from remaining clusters

III. Offline Signal Processing Techniques

Additional signal or image processing can be performed offline (e.g., by another computer located outside of the autonomous vehicle) on PCD to more accurately generate a 3D bounding box over an object. In some embodiments, the sensor data processing module can project the first set of points (that include the second set of points and the third set of points) from the image coordinates to the LiDAR coordinates using camera-to-LiDAR extrinsic parameters. After the first set of points are projected, the sensor data processing module can obtain 3D PCD of the first set of points, where the 3D PCD can be further analyzed by another computer located outside of the autonomous vehicle to generate a more accurate 3D bounding box over an object.

Figure 5:
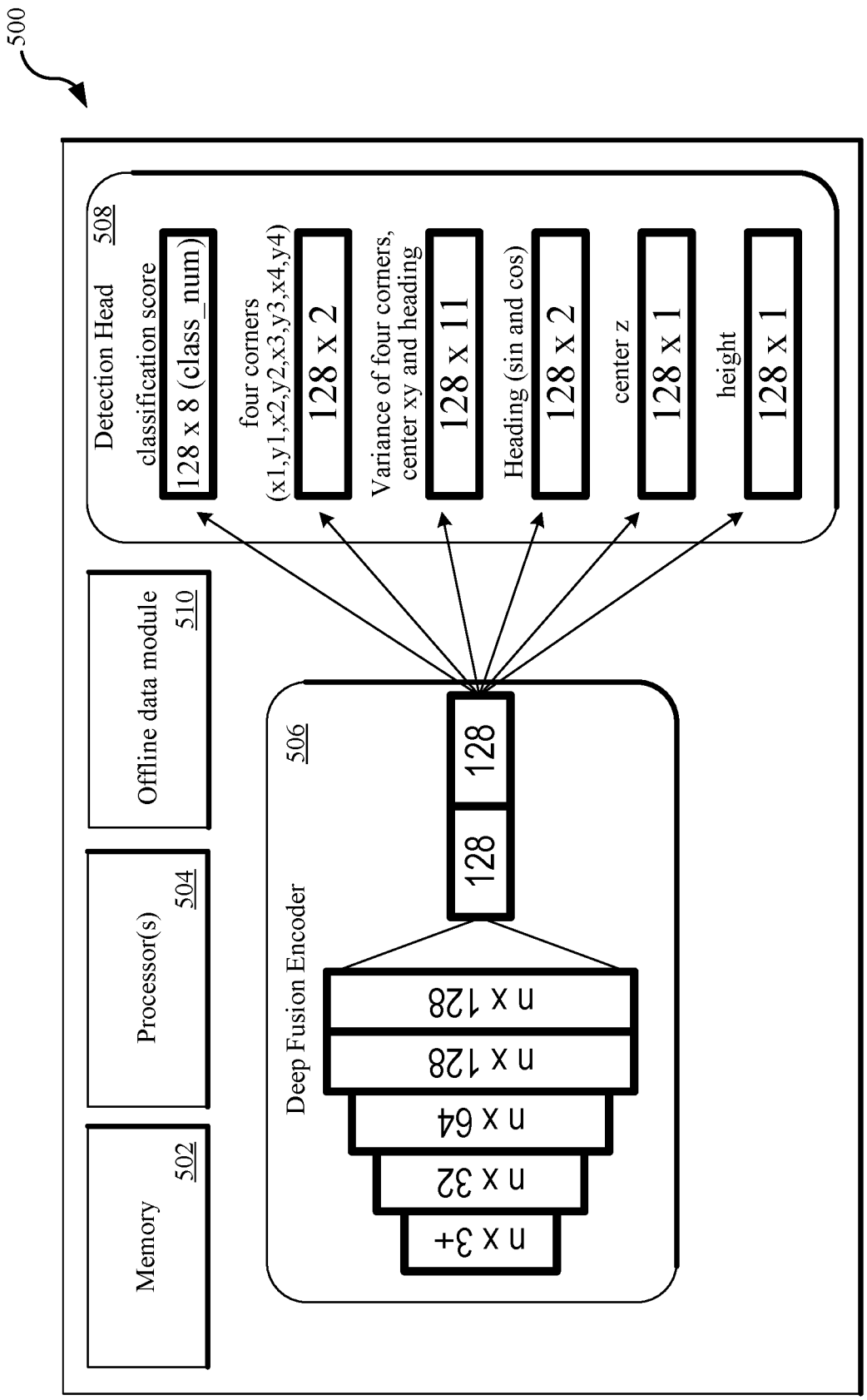
FIG. 5 shows a block diagram of a computer located outside of an autonomous vehicle, where the computer is configured to perform an offline data processing technique.

FIG. 5 shows a block diagram of a 500 computer located outside of an autonomous vehicle, where the 500 computer is configured to perform an offline data processing technique. The computer 500 may include one or more processors 504 that executes processing instructions stored in a non-transitory computer readable medium, such as the memory 502. The deep fusion encoder can include Lidar recurrent convolutional neural network (RCNN) network. The architecture of the deep fusion encoder can be based on the PointNet structure as shown in FIG. 5. The input data is a group of points and each point can have three or more attributes.

The offline data module 510 can use the deep fusion encoder 506 (e.g., a neural network) to obtain 3D proposals (also known as 3D PCD mentioned above) provided by upstream tasks which may be represented as 3D location, dimensions and orientation (yaw angle). For each 3D proposal, the offline data module 510 can use the deep fusion encoder 506 to enlarge the width and length of the bounding box to include more contextual points around it. All the points within the enlarged boxes are extracted and normalized by the offline data module 510 in a canonical coordinate system to form the input data of the R-CNN model. In the canonical coordinate system, the origin is located at the center of the box proposal, the heading is set as the x-axis, and the horizontally orthogonal direction is the y-axis and the vertical up direction is the z-axis. To handle the size ambiguity problem, the offline data module 510 can add virtual points to each bounding box proposal as size-aware point features.

The offline data module 510 can extract points for each 3D proposal and do pre-processing to generate a feature vector for each point. The offline data module 510 can input the points' features into a neural network for each 3D proposal.

The deep fusion encoder 506 may include a Multi-Layer Perceptron (MLP) module with four fully connected layers and a max-pooling operator for feature aggregation. The resulting feature or output of the deep fusion encoder 506 can be input to the classification and regression branches in the detection head 508. The detection head 508 may include a classification branch and multiple regression branches. The classification branch classifies the proposal to different classes while the regression branches aim to refine the input box proposal's parameters (e.g. center and heading) and can therefore be applied only to the positive samples.

Figure 6:
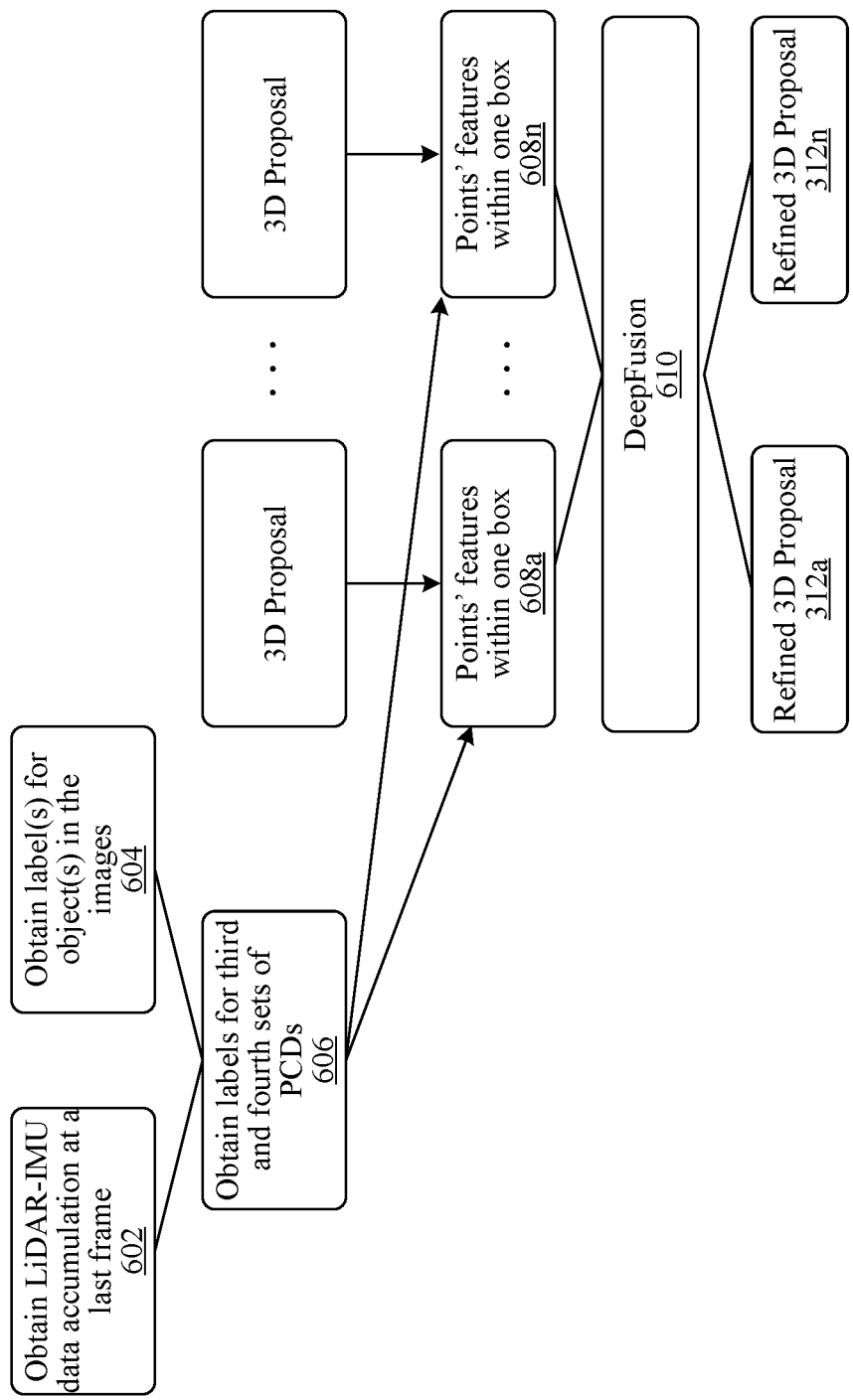
FIG. 6 shows a flowchart for performing an offline signal processing technique by another computer located outside of the autonomous vehicle to refine 3D proposals obtained by a computer located in an autonomous vehicle.

FIG. 6 shows a flowchart for performing an offline signal processing technique by another computer located outside of the autonomous vehicle to refine 3D proposals (also known as 3D PCD) obtained by a computer located in an autonomous vehicle. Operations 602 to 606 are described in this patent document as being performed by a sensor data processing module. For example, operation 602 includes obtaining LiDAR-IMU data accumulation at a last frame at block 320 of FIG. 3. Operation 604 includes obtaining label(s) for the object(s) detected in the images as explained in operation 410 of FIG. 4. Operation 606 includes obtaining the second set of PCD and the third set of PCD with labels as explained in operations 412 and 414 of FIG. 4.

Operations 608a to 608n and 610 can be performed by the offline data module (shown as 510 in FIG. 5). Operation 608a to 608n include obtaining the second set of PCD and the third set of PCD, extracting points in each 3D proposal (or 3D PCD) associated with a bounding box from the second set of PCD, generate virtual points or grid points for each proposal, process feature vector for each point in each proposal, and send the points into a deep neural network. The feature vector for each point may include geometry features (e.g., the bounding box's local coordinates), temporal information such as a continuous variable (e.g., from 0 to 4), a point's range from the bounding box's center, a binary tag identifying whether the point is within box or not, a one-hot vector identifying whether the point is from a LiDAR with a short scanning range or a long scanning range, and/or one-hot vector of image labels. Operation 610 includes performing a deep fusion operation using machine learning techniques (e.g., using the deep fusion encoder (shown as 506 in FIG. 5)) to obtain a refined 3D bounding boxes 312a-312n.

Figure 7:
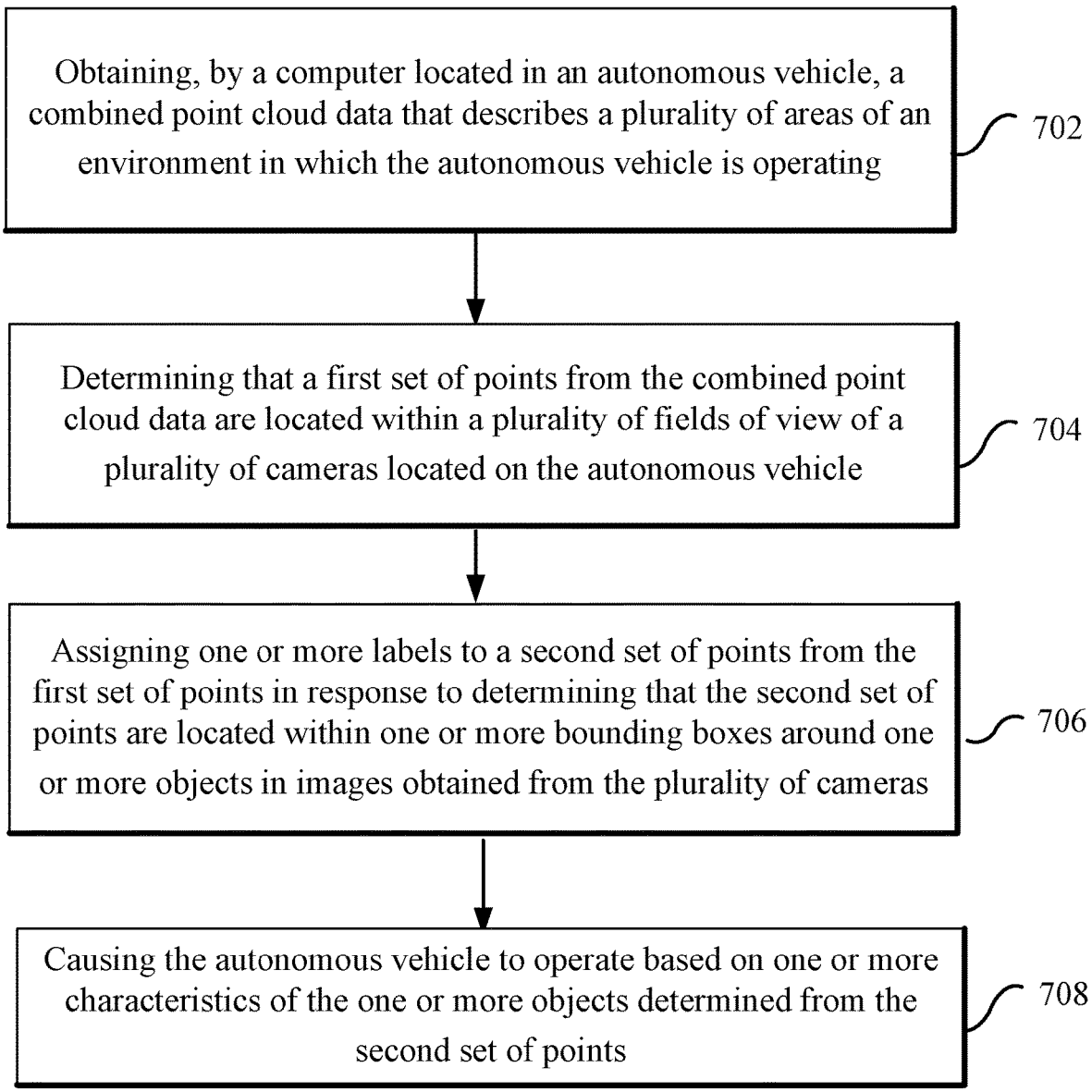
FIG. 7 shows another flowchart of an example signal processing technique performed on PCD from at least two LiDARs for autonomous driving operations.

FIG. 7 shows another flowchart of an example signal processing technique performed on PCD from at least two LiDARs for autonomous driving operations. Operation 702 includes obtaining, by a computer located in an autonomous vehicle, a combined point cloud data that describes a plurality of areas of an environment in which the autonomous vehicle is operating, where the combined point cloud data is obtained by performing a signal processing technique on multiple sets of point cloud data obtained from a plurality of light detection and ranging sensors located on the autonomous vehicle. Operation 704 includes determining that a first set of points from the combined point cloud data are located within a plurality of fields of view of a plurality of cameras located on the autonomous vehicle.

Operation 706 includes assigning one or more labels to a second set of points from the first set of points in response to determining that the second set of points are located within one or more bounding boxes around one or more objects in images obtained from the plurality of cameras, where the one or more labels include information that identifies the one or more objects. Operation 708 includes causing the autonomous vehicle to operate based on one or more characteristics of the one or more objects determined from the second set of points.

In some embodiments, the signal processing technique to obtain the combined point cloud data comprises: receiving, from each of at least two light detection and ranging sensors of the plurality of light detection and ranging sensors, a first set of point cloud data of at least two areas of the plurality of areas of the environment, wherein the multiple sets of point cloud data include the first set of point cloud data that is scanned or obtained at a first time; and obtaining a first set of combined point cloud data by combining the first set of point cloud data of each of the least two light detection and ranging sensors, where the combined point cloud data includes the first set of combined point cloud data.

In some embodiments, the method further comprises receiving, from each of the at least two light detection and ranging sensors, a second set of point cloud data of at least some of the at least two areas, wherein the multiple sets of point cloud data include the second set of point cloud data that is scanned or obtained at a second time later than the first time; obtaining a second set of combined point cloud data by combining the second set of point cloud data of each of the least two light detection and ranging sensors, where the combined point cloud data includes the first set of combined point cloud data combined with the second set of combined point cloud data.

In some embodiments, the first set of combined point cloud data and the second set of combined point cloud data are obtained by: projecting the first set of point cloud data of each of the at least two light detection and ranging sensors onto a three dimensional inertial measurement unit coordinate system using first extrinsic parameters, where the first extrinsic parameters describe a spatial relationship between each of the at least two light detection and ranging sensors and an inertial measurement unit located on or in the autonomous vehicle; and projecting the second set of point cloud data of each of the at least two light detection and ranging sensors onto the three dimensional inertial measurement unit coordinate system using the first extrinsic parameters. In some embodiments, the first extrinsic parameters include IMU-to-LiDAR extrinsic parameters. In some embodiments, the first extrinsic parameters include sets of parameters that are unique to each of the at least two light detection and ranging sensors. In some embodiments, a plurality of sets of combined point cloud data include the first set of combined point cloud data and the second set of combined point cloud data, and wherein a number (or count or total number) of the plurality of sets of combined point cloud data is predetermined.

In some embodiments, each set of point cloud data from the multiple sets of point cloud data is scanned or obtained by a light detection and ranging sensor within a time window, and wherein the first time and the second time are within the time window. In some embodiments, the time window is predetermined. In some embodiments, the first set of combined point cloud data is combined with the second set of combined point cloud data by: obtaining a transformed set of point cloud data by transforming the first set of combined point cloud data and the second set of combined point cloud data to a global coordinate system; and obtaining the combined point cloud data by transforming the transformed set of point cloud data to three dimensional inertial measurement unit coordinates associated with the second time when the second set of point cloud data was obtained or scanned by the least two light detection and ranging sensors.

In some embodiments, each point in the combined point cloud data is associated with a timestamp when a point was scanned or obtained by a light detection and ranging sensor. In some embodiments, the method further comprises: assigning a background label to a third set of points from the first set of points, wherein the third set of points are located outside the one or more bounding boxes around the one or more objects in the images obtained from the plurality of cameras, where the background label indicates that the third set of points are associated with a background in the images. In some embodiments, the method further comprises assigning an unknown label to a fourth set of points from the combined point cloud data in response to determining that the fourth set of points are located outside of the plurality of fields of view of the plurality of cameras.

In some embodiments, the first set of points and the fourth set of points are determined from the combined point cloud data that is projected to the images of the plurality of cameras using second extrinsic parameters, wherein the second extrinsic parameters describe a spatial relationship between each of the plurality of cameras and an inertial measurement unit located on or in the autonomous vehicle. In some embodiments, the second extrinsic parameters include IMU-to-camera extrinsic parameters. In some embodiments, each of the one or more labels includes an object identifier that identifies an object, an object classification that classifies the object, and a confidence value that indicates a confidence level that a label accurately describes the object. In some embodiments, the one or more labels include one or more object identifiers that include unknown, car, truck, bus, pedestrian, motorcycle, cycle, traffic cone, truck head, head, or tail. In some embodiments, the plurality of light detection and ranging sensors are located on a roof of the autonomous vehicle and around an outer region of the autonomous vehicle.

In some embodiments, the plurality of light detection and ranging sensors include at least five light detection and ranging sensors, a first light detection and ranging sensor is located on a first side of a hood, a second light detection and ranging sensor is located on the hood on a second side opposite to the first side, a third light detection and ranging sensor is located on a roof of the autonomous vehicle, a fourth light detection and ranging sensor is located on one side of the autonomous vehicle, and a fifth light detection and ranging sensor is located on another side opposite to the one side of the autonomous vehicle. In some embodiments, the third light detection and ranging sensor has a scanning range that is longer than that of the first light detection and ranging sensor, the second light detection and ranging sensor, the fourth light detection and ranging sensor, and the fifth light detection and ranging sensor.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of autonomous vehicle operation, comprising:

obtaining, by a computer located in an autonomous vehicle, a combined point cloud data that describes a plurality of areas of an environment in which the autonomous vehicle is operating,
   wherein the combined point cloud data is obtained by performing a signal processing technique on multiple sets of point cloud data obtained from a plurality of light detection and ranging sensors located on the autonomous vehicle;
   wherein the combined point cloud data comprises a first set of combined point cloud data combined with a second set of combined point cloud data, wherein the second set of combined point cloud data is obtained or scanned later than the first set of combined point cloud data, wherein the first set of combined point cloud data is obtained by combining a first set of point cloud data of at least two light detection and ranging sensors of the plurality of light detection and ranging sensors;
determining, from the combined point cloud data, a first set of points located within a plurality of fields of view of a plurality of cameras located on the autonomous vehicle;
determining, from the first set of points, a second set of points located within one or more bounding boxes around one or more objects in images obtained from the plurality of cameras,
assigning one or more labels to the second set of points, wherein the one or more labels include information that identifies the one or more objects;
causing the autonomous vehicle to operate based on one or more characteristics of the one or more objects determined from the second set of points;
enlarging the bounding boxes by a deep fuse encoder to include more contextual points;
adding, by the deep fuse encoder, virtual points to each bounding box as size-aware point features; and
extracting and normalizing the points within the enlarged boxes in a canonical coordinate system to form input data of a deep fusion encoder;
wherein the deep fusion encoder comprises a Multi-Layer Perceptron (MLP) module with a plurality of fully connected layers and a max-pooling operator for feature aggregation.

2. The method of claim 1, wherein the signal processing technique to obtain the combined point cloud data comprises:
   receiving, from each of at least two light detection and ranging sensors of the plurality of light detection and ranging sensors, the first set of point cloud data of at least two areas of the plurality of areas of the environment, wherein the multiple sets of point cloud data include the first set of point cloud data that is scanned or obtained at a first time; and
   obtaining the first set of combined point cloud data by combining the first set of point cloud data of each of the least two light detection and ranging sensors.

3. The method of claim 2, further comprising:
receiving, from each of the at least two light detection and ranging sensors, a second set of point cloud data of at least some of the at least two areas, wherein the multiple sets of point cloud data include the second set of point cloud data that is scanned or obtained at a second time later than the first time;
obtaining the second set of combined point cloud data by combining the second set of point cloud data of each of the least two light detection and ranging sensor.

4. The method of claim 3, wherein the first set of combined point cloud data and the second set of combined point cloud data are obtained by:
   projecting the first set of point cloud data of each of the at least two light detection and ranging sensors onto a three dimensional inertial measurement unit coordinate system using first extrinsic parameters,
      wherein the first extrinsic parameters describe a spatial relationship between each of the at least two light detection and ranging sensors and an inertial measurement unit located on or in the autonomous vehicle; and
   projecting the second set of point cloud data of each of the at least two light detection and ranging sensors onto the three dimensional inertial measurement unit coordinate system using the first extrinsic parameters.

5. The method of claim 4, wherein the first extrinsic parameters include sets of parameters that are unique to each of the at least two light detection and ranging sensors.

6. The method of claim 3, wherein obtaining the combined point cloud data comprises: obtaining a plurality of sets of combined point cloud data, each set includes the first set of combined point cloud data and the second set of combined point cloud data, and wherein a number of the plurality of sets of combined point cloud data is predetermined.

7. The method of claim 3, wherein each set of point cloud data from the multiple sets of point cloud data is scanned or obtained by a light detection and ranging sensor within a time window, and wherein the first time and the second time are within the time window.

8. The method of claim 3, wherein the first set of combined point cloud data is combined with the second set of combined point cloud data by:
   obtaining a transformed set of point cloud data by transforming the first set of combined point cloud data and the second set of combined point cloud data to a global coordinate system; and
   obtaining the combined point cloud data by transforming the transformed set of point cloud data to three dimensional inertial measurement unit coordinates associated with the second time when the second set of point cloud data was obtained or scanned by the least two light detection and ranging sensors.

9. A system for autonomous vehicle operation, the system comprising a computer that comprises:
   at least one processor and at least one memory including computer program code which, when executed by the at least one processor, cause the computer to at least:
   obtain a combined point cloud data that describes a plurality of areas of an environment in which an autonomous vehicle is operating,
      wherein the combined point cloud data is obtained by performing a signal processing technique on multiple sets of point cloud data obtained from a plurality of light detection and ranging sensors located on the autonomous vehicle,
      wherein the combined point cloud data comprises a first set of combined point cloud data combined with a second set of combined point cloud data, wherein the second set of combined point cloud data is obtained or scanned later than the first set of combined point cloud data, wherein the first set of combined point cloud data is obtained by combining a first set of point cloud data of at least two light detection and ranging sensors of the plurality of light detection and ranging sensors;

wherein the computer is located in the autonomous vehicle;
determine, from the combined point cloud data, a first set of points located within a plurality of fields of view of a plurality of cameras located on the autonomous vehicle;
determine, from the first set of points, a second set of points located within one or more bounding boxes around one or more objects in images obtained from the plurality of cameras,
assign one or more labels to the second set of points, wherein the one or more labels include information that identifies the one or more objects;
cause the autonomous vehicle to operate based on one or more characteristics of the one or more objects determined from the second set of points;
enlarge the bounding boxes by a deep fuse encoder to include more contextual points;
add, by the deep fuse encoder, virtual points to each bounding box as size-aware point features; and
extract and normalize the points within the enlarged boxes in a canonical coordinate system to form input data of a deep fusion encoder;
wherein the deep fusion encoder comprises a Multi-Layer Perceptron (MLP) module with a plurality of fully connected layers and a max-pooling operator for feature aggregation.

10. The system of claim 9, wherein each point in the combined point cloud data is associated with a timestamp when a point was scanned or obtained by a light detection and ranging sensor.

11. The system of claim 9, wherein each of the one or more labels includes an object identifier that identifies an object, an object classification that classifies the object, and a confidence value that indicates a confidence level that a label accurately describes the object.

12. The system of claim 9, wherein the one or more labels include one or more object identifiers that include unknown, car, truck, bus, pedestrian, motorcycle, cycle, traffic cone, truck head, head, or tail.

13. The system of claim 9,
wherein the plurality of light detection and ranging sensors include at least five light detection and ranging sensors,
wherein a first light detection and ranging sensor is located on a first side of a hood,
wherein a second light detection and ranging sensor is located on the hood on a second side opposite to the first side,
wherein a third light detection and ranging sensor is located on a roof of the autonomous vehicle,
wherein a fourth light detection and ranging sensor is located on one side of the autonomous vehicle, and
wherein a fifth light detection and ranging sensor is located on another side opposite to the one side of the autonomous vehicle.

14. The system of claim 13, wherein the third light detection and ranging sensor has a scanning range that is longer than that of the first light detection and ranging sensor, the second light detection and ranging sensor, the fourth light detection and ranging sensor, and the fifth light detection and ranging sensor.

15. A non-transitory computer readable storage medium having code stored thereon, the code, when executed by a processor, causing the processor to perform operations comprising:

obtaining a combined point cloud data that describes a plurality of areas of an environment in which an autonomous vehicle is operating,
wherein the combined point cloud data is obtained by performing a signal processing technique on multiple sets of point cloud data obtained from a plurality of light detection and ranging sensors located on the autonomous vehicle;
wherein the combined point cloud data comprises a first set of combined point cloud data combined with a second set of combined point cloud data, wherein the second set of combined point cloud data is obtained or scanned later than the first set of combined point cloud data, wherein the first set of combined point cloud data is obtained by combining a first set of point cloud data of at least two light detection and ranging sensors of the plurality of light detection and ranging sensors;
determining, from the combined point cloud data, a first set of points located within a plurality of fields of view of a plurality of cameras located on the autonomous vehicle;
determining, from the first set of points, a second set of points located within one or more bounding boxes around one or more objects in images obtained from the plurality of cameras,
assigning one or more labels to the second set of points, wherein the one or more labels include information that identifies the one or more objects;
causing the autonomous vehicle to operate based on one or more characteristics of the one or more objects determined from the second set of points;
enlarging the bounding boxes by a deep fuse encoder to include more contextual points;
adding, by the deep fuse encoder, virtual points to each bounding box as size-aware point features; and
extracting and normalizing the points within the enlarged boxes in a canonical coordinate system to form input data of a deep fusion encoder;
wherein the deep fusion encoder comprises a Multi-Layer Perceptron (MLP) module with a plurality of fully connected layers and a max-pooling operator for feature aggregation.

16. The non-transitory computer readable storage medium of claim 15, wherein the operations further comprise:
assigning a background label to a third set of points from the first set of points, wherein the third set of points are located outside the one or more bounding boxes around the one or more objects in the images obtained from the plurality of cameras,
wherein the background label indicates that the third set of points are associated with a background in the images.

17. The non-transitory computer readable storage medium of claim 15, wherein the operations further comprise:
assigning an unknown label to a fourth set of points from the combined point cloud data in response to determining that the fourth set of points are located outside of the plurality of fields of view of the plurality of cameras.

18. The non-transitory computer readable storage medium of claim 17, wherein the first set of points and the fourth set of points are determined from the combined point cloud data that is projected to the images of the plurality of cameras using second extrinsic parameters, wherein the second extrinsic parameters describe a spatial relationship between each of the plurality of cameras and an inertial measurement unit located on or in the autonomous vehicle.

* * * * *